United States Patent [19]

Aspden

[11] Patent Number: 4,834,937

[45] Date of Patent: May 30, 1989

[54] FLUID FLOW-RESTRICTING SEALS OR BAFFLES

[75] Inventor: Garth J. Aspden, Bolton, United Kingdom

[73] Assignee: National Nuclear Corporation Ltd., Knutsford, Cheshire, England

[21] Appl. No.: 106,647

[22] Filed: Oct. 13, 1987

[30] Foreign Application Priority Data

Nov. 3, 1986 [GB] United Kingdom ................. 8626237

[51] Int. Cl.$^4$ ............................................. G21C 15/00
[52] U.S. Cl. ..................................... 376/377; 376/399
[58] Field of Search ............... 376/377, 389, 399, 405, 376/404, 441; 138/40, 46, 43, 112, 113, 114, 117

[56] References Cited

U.S. PATENT DOCUMENTS

| | | | |
|---|---|---|---|
| 3,127,324 | 3/1964 | Parr | 138/114 |
| 4,241,789 | 12/1980 | Grosch | 138/113 |
| 4,364,902 | 12/1982 | Feutrel | 376/441 |
| 4,655,998 | 4/1987 | Aspden | 376/290 |
| 4,664,879 | 5/1987 | Blaushild | 376/352 |
| 4,684,501 | 8/1987 | Lui | 376/446 |

*Primary Examiner*—Donald P. Walsh
*Attorney, Agent, or Firm*—William R. Hinds

[57] ABSTRACT

A baffle (12) is provided for the gaps between a pair of surfaces (10, 14). The baffle has a lantern configuration and comprises a number of spring steel foils (15) arranged in side-by-side relation with overlap between adjacent foils. Each foil (15) is of shallow V-configuration. The ends of the V are attached by stud and slot connections (22, 24, 26, 28) to one of the surfaces separated by the gap at axially spaced locations and the midpoint of the V bears against the opposing surface. The stud and slot connections afford limited axial movement of the ends of the V to compensate for irregularities in the gap width.

10 Claims, 3 Drawing Sheets

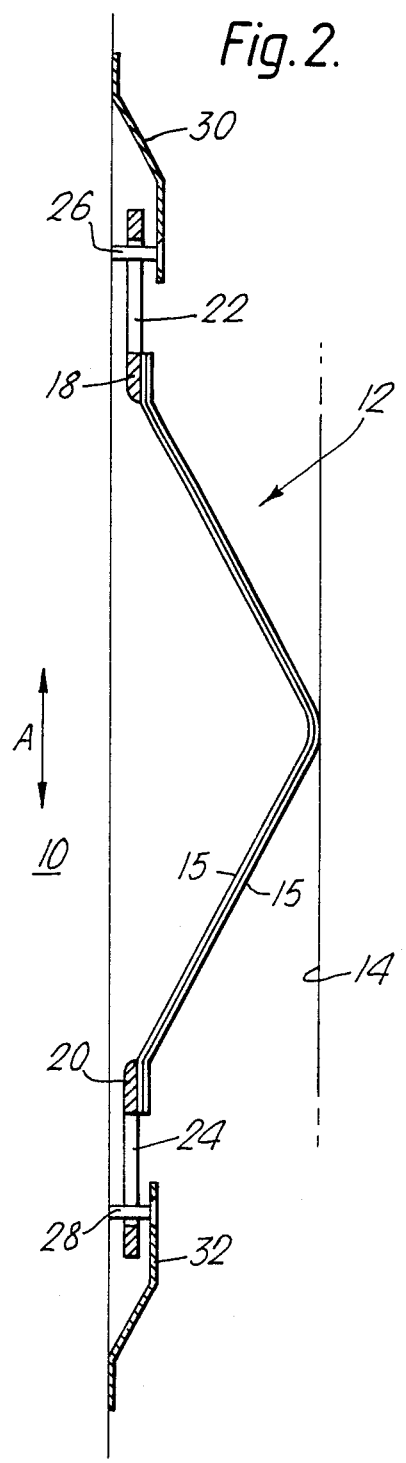

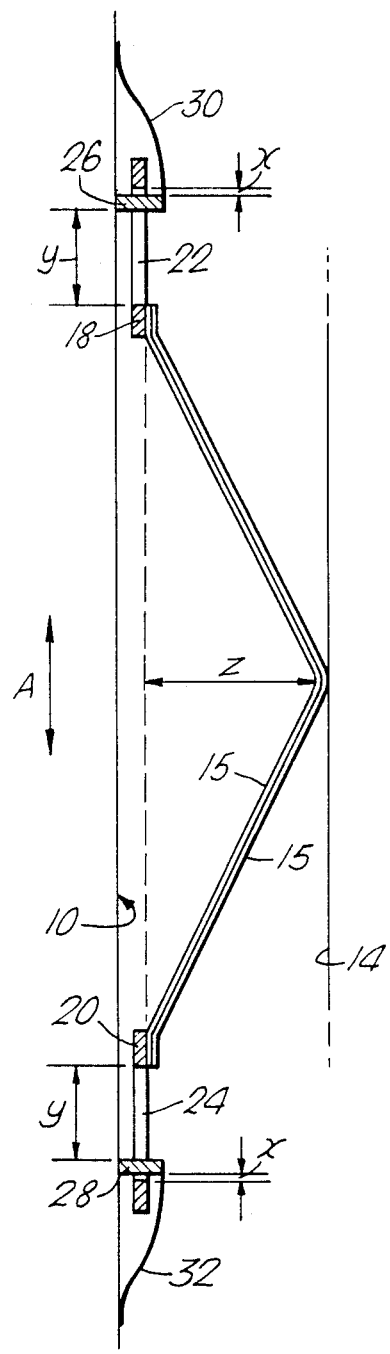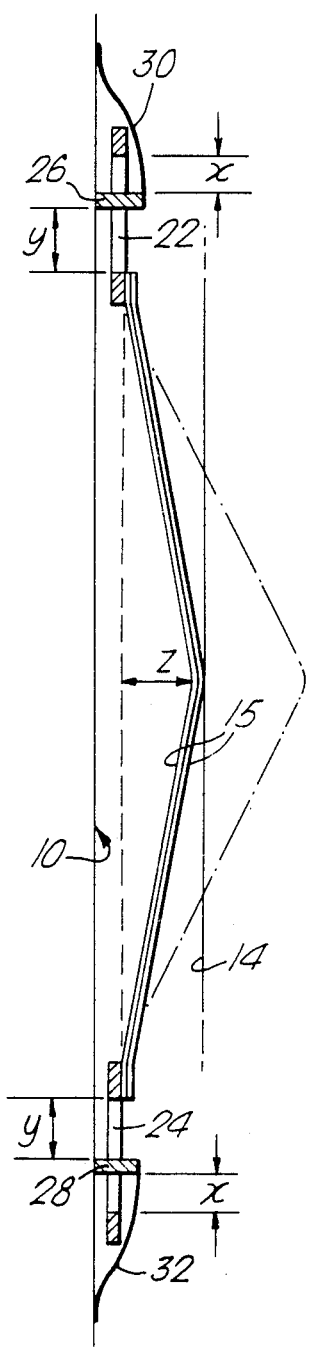

FLUID FLOW-RESTRICTING SEALS OR BAFFLES

This invention relates to fluid flow-restricting baffles or seals (herein referred to generically as baffles).

One application of the invention lies in the restriction of convective gas flows in the region of the roof structure of pool-type liquid metal cooled fast neutron reactors. In such a reactor, the primary circuit carbon steel roof covers the reactor circuit and forms part of the primary vessel containment boundary. In order to ensure the integrity of this part of the boundary the structure must be cooled to maintain material properties well within allowable limits and to control thermal movement and stress to acceptable levels.

Components such as primary pumps and heat exchangers penetrate the roof structure forming annular spaces between components and roof. These spaces connect with the general cover gas region above the liquid metal pool allowing free gas movement between the cover gas region and the annular spaces. Because of the disposition of cold roof over hotter cover gas, thermal syphons can establish within the annular spaces, transporting significant quantities of heat to the roof structure and subsequently to the roof cooling gas. Under certain conditions the syphon systems can rotate causing temperature variation and cyclic stress.

The presence of insulation will increase heat flow to penetrations for the pumps and heat exchangers while open annulus designs will, in any configuration, result in a requirement for increased capacity cooling systems for any given temperature limit of the roof structure. If the roof temperatures are allowed to rise then thermal gradients within the roof structure may be more severe giving rise to potential thermal stress problems. The cyclic thermal stress already noted will add to the overall stress problem.

Thus, in terms of this specific application the invention seeks to provide a fluid flow-restricting baffle suitable for substantially isolating the annular spaces from the cover gas region.

According to the present invention there is provided, for baffling and thereby restricting fluid flow between two surfaces separated by a gap, a baffle comprising an element which is elongated to span the gap substantially coextensively across the direction of flow to be restricted and which is adapted for connection along its side edges to one of the surfaces, the element being foil-like intermediate the side edges over substantially its whole length and being of at least part-sinuous configuration in transverse section to provide at least one peak for bearing against the opposite surface such that, being elastically deformable in consequence of the configuration as aforesaid, the element is enabled to conform with variations in the gap between the surfaces.

The connections between the element and said one surface may be arranged to permit transverse expansion and contraction of the element in response to displacement of said peak(s) as a result of variation in the spacing between the surfaces. In one embodiment, the connections along both side edges are sliding connections and may be implemented by pin and slot type connections.

In practice, the surfaces may move generally parallel relative to one another in a particular direction (for example, as a result of thermal expansion effects) in which case the element will be arranged so as to extend generally perpendicular to said direction and the sliding connections will be arranged to allow transverse expansion and contraction of the element in said direction.

Where such generally parallel relative movement between the surfaces may occur, the sliding connections between the element and said one surface are such that, over the expansion and contraction working range of the element, the element is pulled along with said one surface irrespective of whether that surface moves in one direction or the opposite direction. This may be implemented by providing a certain degree of lost motion in the sliding connections such that, upon movement of said one surface, the lost motion is taken up at the sliding connections along the leading side edge of the element before the lost motion at the trailing edge can be taken up.

The surfaces may define an annular or part-annular gap or the gap may of other configuration, eg. rectilinear or undulating.

In one embodiment of the invention, the element is fabricated from a plurality of spring metal strips each bent to a generally shallow V shape and arranged transversely of the direction of elongation of said element in offset but partly-overlapping relation so that their apices are aligned lengthwise of the element and the overlaps between adjacent strips seal against or at least restrict fluid flow between the strips.

One embodiment of the invention will now be described by way of example only with reference to the accompanying diagrammatic drawings, in which:

FIG. 2 is a longitudinal sectional view illustrating the baffle when operative to provide a sealing action between the component and a penetration bore; and FIGS. 3 and 4 illustrate the relationships between various parameters associated with the sliding connections of the baffle for different spacings between the surfaces between which the baffle is located.

Figure 1:
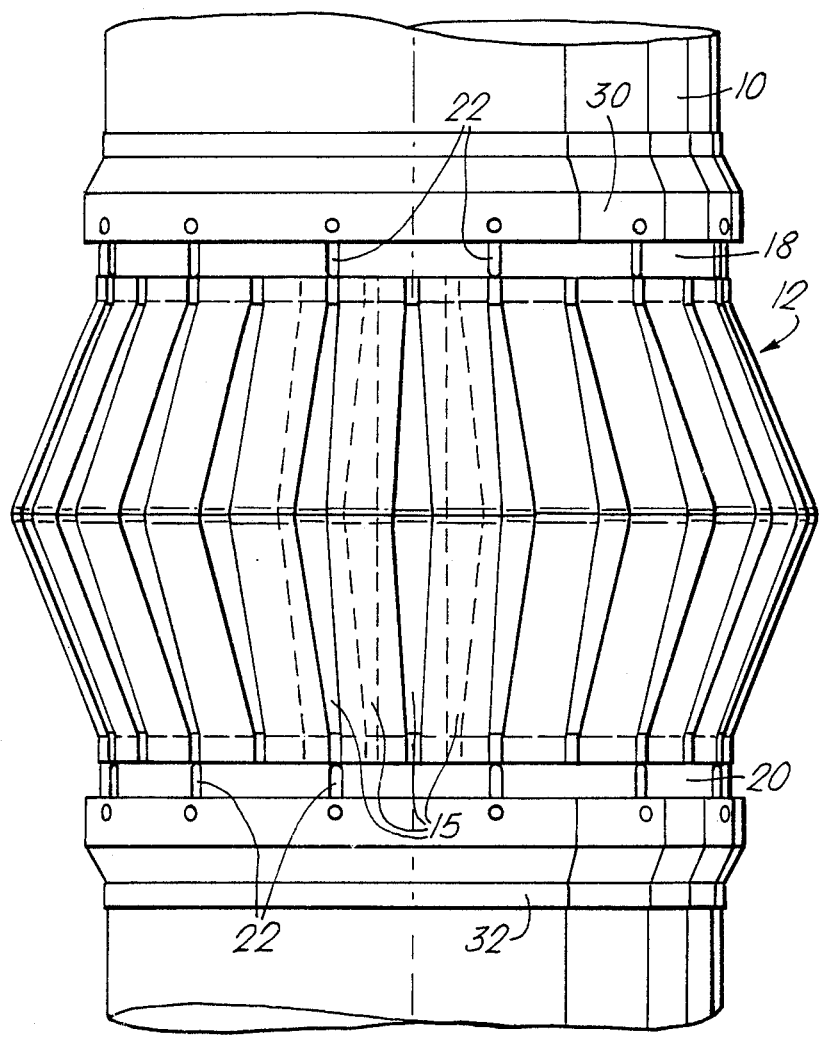
FIG. 1 is a view showing a baffle in accordance with the invention attached to a component such as an intermediate heat exchanger of a liquid metal cooled fast neutron reactor.

Referring to FIGS. 1 and 2, a component 10, such as the outer casing of a heat exchanger or pump for a liquid metal cooled fast neutron reactor, is provided with a baffle 12 to afford some degree of sealing within the annular gap between the component 10 and the roof penetration bore 14 through which the component 10 passes. The baffle 12 comprises a series of spring steel foils 15 arranged in overlapped relation so that the baffle structure 12 can conform to the curvature of the gap but is not interrupted by any gaps around its entire circumference.

As seen in FIG. 2, each foil strip 15 is preformed into a shallow generally V-shape and the ends of the V are affixed to thicker steel location and support bands 18, 20 spaced axially of the component 10 and fastened to the component 10 via sliding connections constituted, in the illustrated embodiment, by axially extending slots 22, 24 in the bands 18, 20 and studs 26, 28 extending between the component 10 and guard plates 30, 32 which overlap the bands 18, 20 to afford protection and additional baffling. The studs 26, 28 may be affixed directly to the component 10 or alternatively they may be carried solely by the guard plates to facilitate attachment and release of the baffle, ie. by springing the guard plates to allow engagement or disengagement of the studs in the slots.

The V shape of the foils 15 will be seen to provide a peak which bears against the opposite surface of the bore 14 to provide a sealing action when the baffle, in normal use, is partly compressed between the opposing surfaces. As will be apparent from FIGS. 3 and 4, the elastically deformable nature of the baffle allows it to follow variations in the spacing between the two surfaces presented by component 10 and bore 14 and because the baffle is fabricated from a relatively large number of spring steel foils, the baffle 12 can readily accommodate variations in the gap width around the circumference of the component 10 since different sections of the baffle may be compressed to differing extents independently of other sections of the baffle.

In addition to variations in the gap width, the component 10 may be movable in the direction A (see FIG. 2) relative to the bore 14 and to ensure that the baffle is always pulled from its leading edge (as considered in the direction of movement of the component 10) rather than being pushed at its trailing edge, the slots 22, 24 are dimensioned so that, over the full working range of radial compression or expansion of the baffle (ie. for all values of z), the dimension x is always less than the dimension y. Thus, for example with reference to FIG. 3 or FIG. 4, if the component 10 moves axially upwards, the slot dimensioning ensures that the stud 26 takes up the lost motion and abuts the top of slot 22 before the stud 28 can abut the top of slot 24. In this way snagging of the baffle with the bore 14 is avoided during thermal transients and when the component is inserted into or withdrawn from the bore 14.

Although the invention is described with reference to a specific application in baffling gas flow along an annular gap, the ambit of the invention is not restricted to this particular application. The gap for instance may be generally rectilinear in which case the baffle will be shaped accordingly.

I claim:

1. For baffling and thereby restricting fluid flow between two surfaces separated by a gap, a baffle comprising an element which is elongated to span the gap substantially coextensively across the direction of flow to be restricted and which is adapted for connection along its side edges to one of the surfaces, the element being foil-like intermediate the side edges over substantially its whole length and being of at least part-sinuous configuration in transverse section to provide at least one peak for bearing against the opposite surface such that, being elastically deformable in consequence of the configuration as aforesaid, the element is enabled to conform with variations in the gap between the surfaces.

2. A baffle as claimed in claim 1 comprising connecting means between the side edges of the element and said one surface for permitting expansion and contraction of said element in a direction generally parallel to said one surface when displacement of said peak(s) occurs as a result of variation in the spacing between said surfaces.

3. A baffle as claimed in claim 2 in which said connecting means comprise sliding connections.

4. A baffle as claimed in claim 2 in which said connecting means comprise pin and slot-type connections.

5. A baffle as claimed in claim 2 in which said one surface is movable relative to the other surface in said generally parallel direction and said connecting means are so arranged that, over the expansion and contraction working range of said element, the element is pulled along with said one surface irrespective of whether that surface moves in one way or the other in that direction.

6. A baffle as claimed in claim 5 in which said connecting means incorporate lost motion such that, upon movement of said one surface in said generally parallel direction, the lost motion is taken up in the connecting means at the leading side edge of the element before the lost motion at the trailing side edge can be taken up.

7. A baffle as claimed in claim 1 in which the surfaces define an annular or part-annular gap.

8. A baffle as claimed in claim 1 in which the element is fabricated from a plurality of spring metal strips each bent to a generally shallow V shape and arranged transversely of the direction of elongation of said element in offset but partly-overlapping relation with their apices aligned lengthwise of the element.

9. A structure comprising a pair of surfaces spaced from one another by a gap and a baffle spanning the gap at least substantially co-extensively to restrict fluid flow in said gap, the baffle comprising:
 (a) a pair of elongated, spaced support bands, which extend generally parallel across the direction of the flow to be restricted;
 (b) means connecting said support bands to one of said surfaces for relative sliding movement of one support band towards and away from the other; and
 (c) a plurality of spring metal strips extending between said support bands, each strip being of at least part-sinuous configuration between its ends to provide at least one peak which bears resiliently against said other surface, said strips being arranged in succession lengthwise of the support bands so that each strip is in part-overlapping relation with its neighbours and, in consequence of the configuration as aforesaid, is elastically deformable for enabling the baffle to conform with variations in the gap between the surfaces.

10. A structure as claimed in claim 9 in which said connecting means comprise pin and slot connections between each support band and said one surface, the slots being so arranged that, if said one surface moves relative to the other surface in a direction generally parallel to said other surface, the play in such connections is taken up at the leading support band before it can be taken up in the connections at the trailing support band.

* * * * *